July 18, 1933.  J. F. CARTER  1,918,833
POWER UNIT FOR INDIVIDUAL LUBRICANT GUNS
Filed Nov. 11, 1931
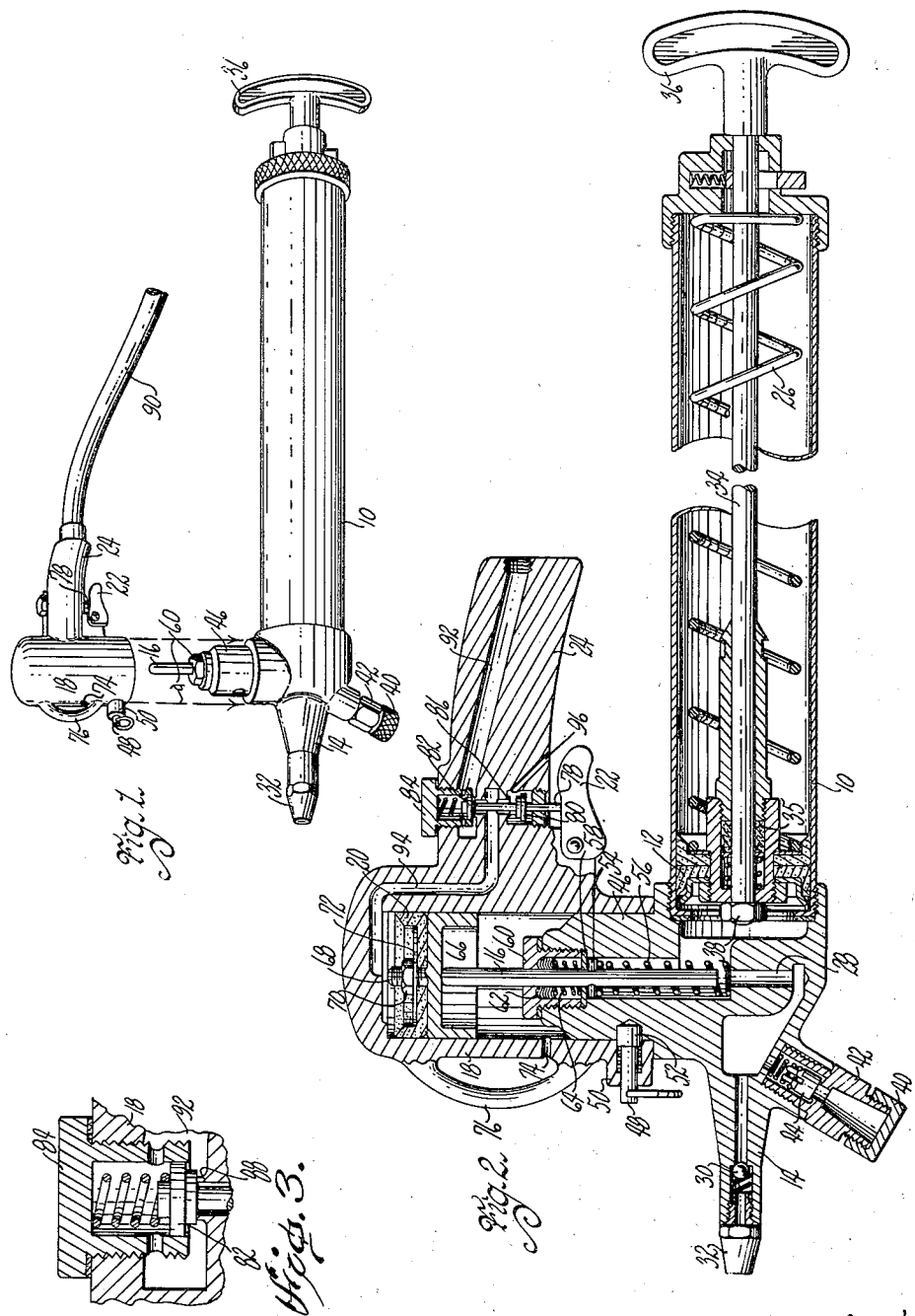

Patented July 18, 1933

1,918,833

UNITED STATES PATENT OFFICE

JOHN F. CARTER, OF BRYAN, OHIO, ASSIGNOR TO THE ARO EQUIPMENT CORPORATION, OF BRYAN, OHIO, A CORPORATION OF OHIO

POWER UNIT FOR INDIVIDUAL LUBRICANT GUNS

Application filed November 11, 1931. Serial No. 574,428.

An object of my invention is to provide a single power unit adaptable for use in connection with a plurality of individual guns each having a different type of lubricant therein, the power unit being comparatively simple and inexpensive to manufacture.

A further object is to provide in connection with a lubricant gun having a supply of lubricant therein, a power operating means for the gun which is detachable therefrom so that it can be attached to another lubricant gun for the same purpose and one power unit will thus serve several lubricant guns.

More particularly, it is my object to provide in combination with a lubricant gun, a detachable power unit which has a cylinder, a piston therein and a valve for controlling the flow of fluid pressure, such as compressed air, to the cylinder, the lubricant gun having a lubricant expeller plunger engaged by the piston whereby movement of the piston of the power unit will expel lubricant from the lubricant gun.

Specialized lubrication is quite essential in connection with greasing of automobiles and the like. By specialized lubrication I have reference to an arrangement wherein a plurality of different grease dispensing guns are employed, each adapted to contain a different grease or lubricant and each adapted to be used upon a different part of an automobile or the like so that the proper grease may be used upon the several parts of the automobile for securing the greatest amount of efficiency of lubrication. To this end there are now in use racks, platforms and supporting boards of all kinds, each adapted to support a plurality of grease dispensing devices or guns. These guns include a supply of lubricant, depending upon the nature of the gun and the kind of work it is to do—that is, as to greasing.

It is my object to associate with a plurality of different guns, one common operating means therefor. It is desirable to secure power actuation for the various grease guns and it is my object to provide a power unit in association with the plurality of grease dispensing guns, which power unit may be temporarily and selectively mounted upon any one of the plurality of grease dispensing guns for discharging grease through the gun then associated with the power unit.

A further object is to provide a single power operating means of such characteristics that it may be easily and quickly installed upon a grease gun, whereby operation thereof will expel or discharge grease from the gun by power applied through the power unit.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of a lubricant gun and a power unit shown separated from each other.

Figure 2 is a longitudinal sectional view through the lubricant gun and power unit showing them connected with each other; and Figure 3 is an enlarged sectional view of the upper portion of the control valve shown in Figure 2.

On the accompanying drawing, I show a lubricant gun consisting in general of a lubricant reservoir cylinder 10, a piston 12 therein, a discharge nozzle 14 and a lubricant expeller plunger 16. I also show a power unit consisting generally of a cylinder 18, a piston 20 and a trigger 22 mounted on a handle 24 for controlling the supply of fluid pressure or compressed air to the cylinder 18.

One use for which my invention is adapted is in connection with a "hand gun board" usually mounted in a vertical position in a lubricant service station and having a plurality of the lubricant guns, one for each type and grade of lubricant, supported thereon by hooks or the like. Heretofore such lubricant guns have been entirely operated by hand and its is my purpose to provide a single power unit, which may also be supported on the hand gun board when not in use, for detachable connection with any one of the lubricant guns, so that lubricant may be expelled therefrom by power imparted thereto by the power unit.

I will now describe the lubricant gun and the power unit specifically. The piston 12 is constrained toward movement in one direction by a spring 26 for expelling lubricant from the cylinder 10 through a plunger cylinder 28 and the nozzle 14. A check valve 30, however, normally prevents such expelling of the lubricant so that it is not forced out from the nozzle point 32 except when more force than that imparted to the piston 12 by the spring 26 is used.

The piston 12 is adapted for also filling the reservoir cylinder 10 by hand. This is accomplished by a piston rod 34 having a handle 36 on one end and a stop nut 38 on its other end. To fill the cylinder 10, a cap 40 is removed from an intake nozzle 42 and the nozzle is thrust into a supply of the lubricant and the handle 36 then pulled upon for moving the piston 12 in a right hand direction. Thus the lubricant opens a check valve 44 and is drawn through the plunger cylinder 28 into the reservoir cylinder 10. The check valve 44 prevents the spring 26 from forcing the lubricant out again. Thereafter the cap 40 is replaced.

The handle 36 and piston rod 34 may now be pushed inwardly so as not to project out in the way. Packing 35 is carried by the piston 12 and surrounds the piston rod 34 to prevent leakage of the lubricant from the left to the right side of the piston. The lubricant gun is now filled and ready for operation by the power unit.

The lubricant gun includes a hub 46 snugly fitting in the cylinder 18 of the power unit. A spring pressed locking pin 48 is mounted in a hub 50 of the cylinder 18 and engages a socket 52 of the hub 46 for retaining the cylinder 18 in attached position relative to the lubricant gun. The pin 48 may be manually withdrawn from the socket 52 for detaching the power unit from the lubricant gun.

The lubricant expeller plunger 16 is provided with a pin 54 between which and a shoulder at the upper end of the plunger cylinder 28, a spring 56 is interposed. The spring 56 tends to extend the plunger 16 to the position shown in Figure 2 and to also move the power piston 20 upwardly as will hereinafter be described.

The plunger 16 is guided by a washer 58 and a packing nut 60. Packing 62 is provided in the nut 60 to prevent leakage and is retained tight by a spring 64.

The piston 20 may be of the cup leather type and mounted on a guide member 66. The guide member 66 has a stud 68 on which a nut 70 is mounted for holding a washer 72 against the piston 20 and thereby holding the piston assembled with the guide member 66. An opening 74 is provided in the cylinder 18 to allow passage of air from the cylinder 18 beneath the guide member 66, so that its movement will not be hampered. A handle 76 is provided on the cylinder 18, which in conjunction with the handle 24 facilitates handling of the power unit and lubricant gun during lubricating operations.

The trigger 22 is adapted to engage a valve stem 78 having a pair of valves 80 and 82 thereon. A spring 84 constrains the valve stem 78 and the valves 80 and 82 toward movement in one direction.

The valve 80 is adapted to coact with an exhaust valve seat 86 when the trigger 22 is pulled toward the handle 24, while the valve 82 is adapted to seat on an intake valve seat 88 because of the action of the spring 84.

Fluid pressure, such as compressed air, is supplied to the handle 24 from a flexible hose 90 which communicates with a passageway 92. The passageway 92, when the valve 82 is open, communicates with a passageway 94 leading to the cylinder 18. When the valve 80 is open, the passageway 94 communicates with an exhaust passageway 96.

*Practical operation*

The operation for filling the reservoir 10 with the proper lubricant has already been disclosed. With the parts in the position shown in Figure 2, the nozzle point 32 may be held against a Zerk fitting or a fitting of the proper type for connection with an Alemite fitting may be substituted therefor and connected with the Alemite fitting. Although two fittings are mentioned, it is obvious that the nozzle point may be adapted for any type of lubricant receiving fitting. The trigger 22 when depressed will close the valve 80 and open the valve 82, thus allowing compressed air to enter the cylinder 18 and force the piston 20 downwardly. This imparts downward movement to the plunger 16, so that it enters the plunger cylinder 28 and forces lubricant therefrom and through the check valve 30 and nozzle point 32 into the lubricant receiving fitting. Since the area of the plunger 16 is much less than the area of the piston 20, the lubricant will be forced from the point 32 under high pressure.

After the down stroke of the plunger 16 is completed, the trigger 22 may be released, thus allowing compressed air from the cylinder 18 to escape through the exhaust passageway 96. The plunger 16 and the piston 20 will be raised by the spring 56. If another "shot" of lubricant is desired, the trigger 22 may again be depressed and released.

When it is desired to supply another type of lubricant, the power unit may be disconnected from the lubricant gun which has been used and connected with another gun having the proper type of grease or lubricant in the reservoir cylinder thereof.

Thus the single power unit may be selectively used for any one of a plurality of lubricant guns and the service man does not need to go to the expense of providing lubricant guns, each with a power unit built therein, in which case he would have to have quite a number of power units instead of the single one.

While I have described and disclosed a power unit which is fluid pressure operated, it will of course be understood that the power unit may be of any design as will permit ready adaptation thereof to any one of the plurality of grease dispensing devices wherein the power unit will serve as the medium for expelling grease through the gun to the part to be lubricated.

One of the principal advantages of my device is found in the arrangement whereby one operating means may be selectively, temporarily and detachably associated with any one of the plurality of grease dispensing devices for dispensing grease of different characteristics to different parts of an automobile or the like requiring different kinds and types of grease.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A power unit for use with a plurality of individual lubricant guns each having a lubricant expeller plunger, said power unit being detachably and selectively connectible with any one of said lubricant guns for exerting power on the lubricant expeller plunger thereof and comprising a piston engageable with said plunger and means for controlling the supply of fluid pressure to said piston.

2. In a device of the class described, a lubricant gun comprising a discharge nozzle, a cylinder, and a lubricant expeller plunger for expelling lubricant from said cylinder in combination with a power unit for said lubricant gun detachably connected therewith and comprising a power moved member engageable with said lubricant expeller plunger.

3. In a device of the class described, a lubricant gun comprising a discharge nozzle, a cylinder, a lubricant expeller plunger therein and spring means to move said plunger to extended position in combination with a power unit for said lubricant gun detachably connected therewith and comprising a power moved member engageable with said lubricant expeller plunger.

4. In a device of the class described, a lubricant gun comprising a discharge nozzle, a cylinder, and a lubricant expeller plunger for expelling lubricant from said cylinder in combination with a power unit for said lubricant gun detachably connected therewith and comprising a cylinder, a power piston therein for engagement with said lubricant expeller plunger and means to control the flow of fluid pressure to said last mentioned cylinder for moving said power piston.

5. In a device of the class described, a lubricant gun comprising a discharge nozzle, a cylinder, and a lubricant expeller plunger for expelling lubricant from said cylinder in combination with a power unit for said lubricant gun detachably connected therewith and comprising a cylinder, a power piston therein for engagement with said lubricant expeller plunger and means for admitting fluid pressure to said last mentioned cylinder to move said power piston and thereby said lubricant expeller plunger when in one position and for allowing exhaust of fluid pressure therefrom when in another position.

6. In a device of the class described, a lubricant gun comprising a discharge nozzle, a cylinder, and a lubricant expeller plunger for expelling lubricant from said cylinder in combination with a power unit for said lubricant gun detachably connected therewith and comprising a cylinder, a power piston therein for engagement with said lubricant expeller plunger and means for admitting fluid pressure to said last mentioned cylinder to move said power piston and thereby said lubricant expeller plunger when in one position and for allowing exhaust of fluid pressure therefrom when in another position, said lubricant gun including spring means to move said lubricant expeller plunger and said power piston to cause such exhaust of air from the power unit.

7. The combination with a lubricant gun having a lubricant reservoir, a discharge nozzle and a spring extended lubricant expeller plunger, of a power unit for imparting movement to said plunger and detachably connected with said lubricant gun for moving said plunger against its extending tendency whereby a single power unit may be selectively used in connection with a plurality of such lubricant guns, each having a different type of lubricant therein.

8. The combination with a lubricant gun having a lubricant reservoir, a discharge nozzle and a lubricant expeller plunger, of a fluid pressure operated unit for imparting movement to said plunger and detachably connected with said lubricant gun whereby a single one of said units may be selectively used in connection with a plurality of such lubricant guns each having a different type of lubricant therein.

9. In a device of the class described, a portable lubricant gun comprising a discharge nozzle, a lubricant reservoir and a lubricant expeller plunger for expelling lubricant from said reservoir through said discharge nozzle in combination with a portable power unit for said lubricant gun detachably connected therewith and comprising a power moved member engageable with said lubricant expeller plunger.

10. In a device of the class described, a portable lubricant gun comprising a discharge nozzle, a lubricant reservoir and a lubricant expeller plunger for expelling lubricant from said reservoir through said discharge nozzle in combination with a portable power unit for said lubricant gun detachably connected therewith and comprising a power moved member engageable with said lubricant expeller plunger and manual means for controlling the operation of said power moved member.

11. A power unit for selective use with a plurality of portable lubricant guns, each gun being complete for the discharge of lubricant therefrom except for a power means to dispense lubricant from said guns, said power unit being adapted for connection with any one of the lubricant guns and serving when connected as the power means for dispensing lubricant from said lubricant guns and remaining free of the lubricant at all times.

12. A power unit adapted to be interchangeably connected with lubricating guns having lubricating expeller plungers, said power unit having motivating means therein, arranged to actuate said plungers when connected to the guns.

13. A power unit adapted to be interchangeably connected with lubricating guns having lubricating expeller plungers, said power unit having motivating means therein arranged to actuate said plungers when connected to the guns, and a handle portion on said power unit for permitting the lubricant gun and power unit to be handled as a single portable grease dispensing device.

14. A power unit adapted to be interchangeably connected with lubricating guns having lubricating expeller plungers, said power unit having motivating means therein for operating said expeller plungers, whereby the power unit may be employed for dispensing lubricant of different guns to different parts of a device to be lubricated and a manual control for the motivating means of said power unit.

15. In an apparatus of the class described, a single power unit including a power driven member adapted to be interchangeably connected with individual lubricant guns adapted to have different lubricants contained therein, said guns having discharge nozzles, expeller plungers acting upon the lubricant contained in said guns to force lubricant under pressure therefrom and through said discharge nozzles, said power unit, through said power driven member, operating said expeller plungers.

16. A power unit adapted to be interchangeably connected with portable lubricant guns, each gun having a discharge nozzle and a lubricant reservoir and movable means for expelling lubricant from said guns, means of connection between said power unit and said guns whereby said power unit is detachably connectible with any one of the lubricant guns, said power unit comprising a power moved member engageable with said movable means for discharging lubricant from the guns, said power unit when removed from the guns, being free of the lubricant thereof.

17. A power unit adapted to be interchangeably connected with portable lubricant guns having discharge nozzles and lubricant reservoirs, means for detachably connecting said power unit with said lubricant guns and said power unit having motivating means therein for operating said guns for discharging lubricant from the guns, said power unit when removed from the guns, being free of the lubricant thereof.

18. A power unit adapted to be interchangeably connected with portable lubricant guns having discharge nozzles and lubricant reservoirs, means for detachably connecting said power unit with said lubricant guns and said power unit having motivating means therein for operating said guns for discharging lubricant from the guns and control means for said motivating means.

19. In a lubricant dispensing device, the combination of a power unit and a quick detachable pumping unit, said pumping unit comprising a cylinder and a plunger, means in one unit for forcing the plunger in one direction, means in the other unit for forcing the plunger in the opposite direction, and the parting line of the two units lying between the two means.

20. In a lubricant dispensing device, the combination of a power unit, including a cylinder, a piston and means for retaining the piston in the cylinder, and a pumping unit comprising a second cylinder, means for securing the pumping unit to the power unit with the plunger in axial alignment with the piston, means for supplying air to the piston for moving it in one direction, and spring means for returning the piston in the opposite direction.

JOHN F. CARTER.